(12) United States Patent
Wu et al.

(10) Patent No.: US 11,838,251 B2
(45) Date of Patent: Dec. 5, 2023

(54) INFORMATION INTERACTION METHOD, APPARATUS, DEVICE, STORAGE MEDIUM AND PROGRAM PRODUCT

(71) Applicant: Beijing Bytedance Network Technology Co., Ltd., Beijing (CN)

(72) Inventors: Yijiao Wu, Beijing (CN); Zhejun He, Beijing (CN); Kefei Wu, Beijing (CN); Chenman Zhou, Beijing (CN); Siqi Tan, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/932,663

(22) Filed: Sep. 15, 2022

(65) Prior Publication Data

US 2023/0013656 A1   Jan. 19, 2023

Related U.S. Application Data

(63) Continuation of application No. 17/722,809, filed on Apr. 18, 2022, now Pat. No. 11,483,264, which is a
(Continued)

(30) Foreign Application Priority Data

Dec. 25, 2020   (CN) .......................... 202011563916.X

(51) Int. Cl.
    *G06F 15/16*    (2006.01)
    *H04L 51/046*    (2022.01)
(Continued)

(52) U.S. Cl.
    CPC .......... *H04L 51/046* (2013.01); *H04L 51/216* (2022.05); *H04N 21/478* (2013.01); *G06Q 50/01* (2013.01)

(58) Field of Classification Search
CPC ... H04L 51/046; H04L 51/216; H04N 21/478; G06Q 50/01
(Continued)

(56) References Cited

U.S. PATENT DOCUMENTS 9,648,390 B2 * 5/2017 Perez ..................... H04N 21/47
9,998,796 B1 * 6/2018 Kedenburg, III .... H04N 21/466
(Continued)

FOREIGN PATENT DOCUMENTS

CN     103150325 A    6/2013
CN     103186533 A    7/2013
(Continued)

OTHER PUBLICATIONS

First Office Action dated Jun. 3, 2020 in Chinese Patent Application No. 201811325400.4 (w. English translation).
(Continued)

*Primary Examiner* — Anthony Mejia

(57) ABSTRACT

The present disclosure provides an information interaction method, an apparatus, a device, a storage medium and a program product. The method includes: displaying, in a graphical user interface displayed by a display device, target information; acquiring, based on a first user input received in the graphical user interface, a reply instruction directed to the target information, and displaying, by the display device, a video acquisition interface in response to the reply instruction; acquiring a target video using the video acquisition interface; after acquiring the target video, displaying, in the graphical user interface, a sticker on the target video, where the sticker includes at least a portion of the target information to which the reply instruction was directed; displaying, in the graphical user interface, the target video, with the sticker, where the target video is a video published on a feed and is a reply to the target information.

29 Claims, 23 Drawing Sheets

Related U.S. Application Data continuation of application No. PCT/CN2021/134870, filed on Dec. 1, 2021.

(51) Int. Cl.
*H04L 51/216* (2022.01)
*H04N 21/478* (2011.01)
*G06Q 50/00* (2012.01)

(58) Field of Classification Search
USPC .......................................................... 709/206
See application file for complete search history.

(56) References Cited

U.S. PATENT DOCUMENTS

| | | | |
|---|---|---|---|
| 10,126,927 | B1 | 11/2018 | Fieldman |
| 10,354,633 | B2 * | 7/2019 | O'Driscoll ............ G06F 3/0482 |
| 10,694,140 | B1 * | 6/2020 | Chen ................. H04N 21/4758 |
| 10,963,128 | B1 * | 3/2021 | Paul ....................... G06F 3/0486 |
| 11,115,720 | B2 * | 9/2021 | Kedenburg, III .. H04N 21/4753 |
| 11,175,807 | B1 * | 11/2021 | Jain ....................... H04L 67/535 |
| 11,340,758 | B1 * | 5/2022 | Sood ........................ H04W 4/21 |
| 11,544,590 | B2 * | 1/2023 | Kim ........................ G06N 3/045 |
| 11,599,252 | B1 * | 3/2023 | Li ........................... G06F 3/0484 |
| 2006/0253542 | A1 | 11/2006 | McCausland et al. |
| 2015/0149315 | A1 * | 5/2015 | Tischer .................. G06Q 50/01 |
| | | | 705/26.1 |
| 2015/0281643 | A1 * | 10/2015 | Calvagna .......... H04M 1/72439 |
| | | | 348/14.03 |
| 2016/0260130 | A1 * | 9/2016 | Chand ................. G06F 16/5854 |
| 2017/0336960 | A1 * | 11/2017 | Chaudhri ................ H04L 51/18 |
| 2018/0091728 | A1 * | 3/2018 | Brown .................. G11B 27/34 |
| 2018/0160180 | A1 | 6/2018 | Kedenburg, III |
| 2018/0161681 | A1 * | 6/2018 | Abecassis ............... A63F 13/61 |
| 2020/0078676 | A1 * | 3/2020 | Gunawan ............... G06Q 50/10 |
| 2021/0031105 | A1 * | 2/2021 | Ganschow ............ G06F 3/0482 |
| 2021/0035609 | A1 | 2/2021 | Zhao et al. |
| 2021/0344792 | A1 | 11/2021 | Kats |
| 2021/0344795 | A1 | 11/2021 | Kats et al. |
| 2023/0013656 | A1 * | 1/2023 | Wu ....................... H04N 21/478 |

FOREIGN PATENT DOCUMENTS

| | | | |
|---|---|---|---|
| CN | 104113787 | A | 10/2014 |
| CN | 105095389 | A | 11/2015 |
| CN | 105142031 | A | 12/2015 |
| CN | 105338410 | A | 2/2016 |
| CN | 105847116 | A | 8/2016 |
| CN | 105872818 | A | 8/2016 |
| CN | 105872820 | A | 8/2016 |
| CN | 105898599 | A | 8/2016 |
| CN | 106294436 | A | 1/2017 |
| CN | 107040808 | A | 8/2017 |
| CN | 107220387 | A | 9/2017 |
| CN | 107241622 | A | 10/2017 |
| CN | 107707461 | A | 2/2018 |
| CN | 107766548 | A | 3/2018 |
| CN | 108668176 | A | 10/2018 |
| CN | 108668179 | A | 10/2018 |
| CN | 109067985 | A | 12/2018 |
| CN | 109120866 | A | 1/2019 |
| CN | 109167950 | A | 1/2019 |
| CN | 109348299 | A | 2/2019 |
| CN | 109525896 | A | 3/2019 |
| CN | 109660873 | A | 4/2019 |
| CN | 110347871 | A | 10/2019 |
| CN | 111228791 | A | 6/2020 |
| CN | 111409081 | A | 7/2020 |
| CN | 111881270 | A | 11/2020 |
| CN | 111949822 | A | 11/2020 |
| CN | 112698769 | A | 4/2021 |
| JP | 2021517696 | A | 7/2021 |
| RU | 106016 | U1 | 6/2011 |
| RU | 2516476 | C2 | 5/2014 |
| RU | 161529 | U1 | 4/2016 |
| WO | 2015012580 | A1 | 1/2015 |
| WO | 2020083021 | A1 | 4/2020 |
| WO | WO-2021211168 | A1 * | 10/2021 ............... G09B 5/06 |

OTHER PUBLICATIONS

Second Office Action dated Feb. 3, 2021 in Chinese Patent Application No. 201811325400.4 (w. English translation).
Third Office Action dated Dec. 30, 2021 in Chinese Patent Application No. 201811325400.4 (w. English translation).
Fourth Office Action dated Mar. 23, 2022 in Chinese Patent Application No. 201811325400.4 (w. English translation).
First Office Action dated Sep. 9, 2019 in Chinese Patent Application No. 201811325832.5 (w. English translation).
Second Office Action dated Dec. 23, 2019 in Chinese Patent Application No. 201811325832.5 (w. English translation).
Third Office Action dated Jan. 13, 2022 in Chinese Patent Application No. 201811325832.5 (w. English translation).
First Office Action dated Dec. 2, 2021 in Chinese Patent Application No. 202011563916.X (w. English translation).
Extended EP Search Report dated Jan. 16, 2023 in EP Appl. No. 21893105.3 (7 pages).
Notice of Refusal drafted Feb. 24, 2023 in JP Appl. No. 2022-527895, English translation (8 pages).
Office Action dated Feb. 6, 2023 in RU Appl. No. 2022114462, English translation (11 pages).
Grant of Invention Patent dated Aug. 11, 2023 in RU Appl. No. 2022114462/28, English translation (24 pages).
Notice of Registration dated Aug. 30, 2023 in Chinese Application No. 202011563916.X, with English translation (12 pages).

* cited by examiner

US 11,838,251 B2

INFORMATION INTERACTION METHOD, APPARATUS, DEVICE, STORAGE MEDIUM AND PROGRAM PRODUCT

CROSS-REFERENCE TO RELATED APPLICATIONS

The present disclosure is a continuation of U.S. patent application Ser. No. 17/722,809, filed on Apr. 18, 2022, which is a continuation of International Application No. PCT/CN2021/134870, filed on Dec. 1, 2021, which claims the priority benefit of Chinese patent application No. 202011563916.X, filed on Dec. 25, 2020, and entitled "INFORMATION INTERACTION METHOD, APPARATUS, DEVICE, STORAGE MEDIUM AND PROGRAM PRODUCT", the disclosures of the above applications are incorporated herein by reference in their entireties.

TECHNICAL FIELD

The present disclosure relates to the field of information interaction technology, in particular to an information interaction method, an apparatus, a device, a storage medium and a program product.

BACKGROUND

With a development of network technology, users can communicate with each other and obtain valuable information through questions-and-answers or comments on various information interaction platforms.

At present, a way of communication is usually that a responder makes a text reply to text information published by other users on the information exchange platform.

However the form of text reply requires the responder to input word by word, so interaction efficiency is low. Moreover, the form of text reply depends on text expression, and the amount of information carried is relatively limited.

SUMMARY

The present disclosure provides an information interaction method, an apparatus, a device, a storage medium and a program product, which is used to solve a technical problem of low interaction efficiency and a limited amount of information in a form of text reply.

In a first aspect, an embodiment of the present disclosure provides an information interaction method, including: displaying target information in an information display interface: acquiring a reply instruction for the target information; displaying a shooting interface in response to the reply instruction; and acquiring a target video through the shooting interface, where the target video is used to reply to the target information.

In a second aspect, an embodiment of the present disclosure provides an information interaction apparatus, including: a displaying module, configured to display target information in an information display interface; an acquiring module, configured to acquire a reply instruction for the target information; the displaying module is further configured to display a shooting interface in response to the reply instruction; and an inputting module, configured to acquire a target video through the shooting interface, where the target video is used to reply to the target information.

In a third aspect, an embodiment of the present disclosure provides an electronic device, including: a processor; and a memory storing a computer program; where the processor is configured to implement the information interaction method according to the first aspect and various possible designs of the first aspect by executing the computer program.

In a fourth aspect, an embodiment of the present disclosure provides a computer-readable storage medium. where a computer execution instruction is stored in the computer-readable storage medium, when a processor executes the computer execution instruction, the information interaction method according to the first aspect and various possible designs of the first aspect is implemented.

In a fifth aspect, an embodiment of the present disclosure provides a computer program product including a computer program, where when the computer program is executed by a processor, the information interaction method according to the first aspect and various possible designs of the first aspect is implemented.

In a sixth aspect, an embodiment of the present disclosure provides a computer program, where when the computer program is executed by a processor, the information interaction method according to the first aspect and various possible designs of the first aspect is implemented.

In an information interaction method, apparatus, a device, a storage medium and a program product provided by an embodiment of the present disclosure, by acquiring a reply instruction acting on target information in an information display interface, inputting a target video used to reply to the target information in a shooting interface, a video reply to the target information in the information display interface can be made. Taking advantage of a large amount of information carried by a video, the reply content has a more obvious intention, so that while improving reply efficiency of a responder, it also makes it easier for a questioner to understand.

BRIEF DESCRIPTION OF DRAWINGS

In order to explain the embodiments of the present disclosure or the technical solutions in prior art more clearly, drawings required to be used in the embodiments or the description of the prior art will be introduced briefly in the following. It is obvious that the drawings in the following description are some embodiments of the present disclosure. For those skilled in the art, other drawings may also be obtained based on these drawings without creative effort.

DESCRIPTION OF EMBODIMENTS

Figure 1:
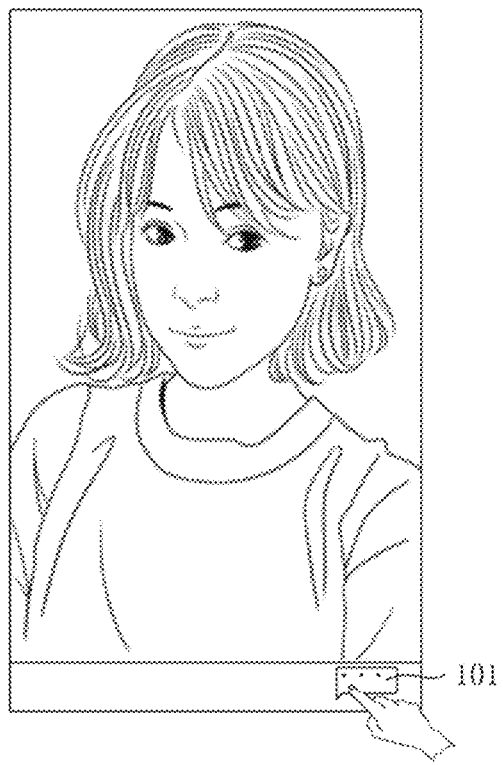
FIG. 1 is an application scenario diagram of an information interaction method according to an exemplary embodiment of the present disclosure.

Hereinafter, embodiments of the present disclosure will be described in more detail with reference to the accompanying drawings. Although some embodiments of the present disclosure are shown in the accompanying drawings, it should be understood that the present disclosure can be implemented in various forms and should not be construed as being to the embodiments set forth herein. On the contrary, these embodiments are provided for a more thorough and complete understanding of the present disclosure. It should be understood that the drawings and embodiments of the present disclosure are only for exemplary purposes and are not intended to limit the protection scope of the present disclosure.

It should be understood that steps recorded in method implementations of the present disclosure may be executed in a different order author executed in parallel. Further, method implementations may include additional steps and/or omit performing the illustrated steps. The scope of the present disclosure is not limited in this regard.

The term "including" and its variations used herein are open-ended includes, that is, "including but not limited to". The term "based on" is "based at least in part on". The term "one embodiment" means "at least one embodiment"; the term "another embodiment" means "at least one other embodiment"; the term "sonic embodiments" means "at least some embodiments". Relevant definitions of other terms will be given in the following description.

It should be noted that the modifications of "one" and "multiple" mentioned in the present disclosure are illustrative rather than restrictive, and those skilled in the art should understand that they should be understood as "one or multiple" unless otherwise clearly indicated in the context.

At present, users can communicate with each other and obtain valuable information through questions or comments on various information interaction platforms, but a way of communication currently is usually that. a responder makes a text reply to a text published by other users on the information exchange platform. However, a form of text reply requires the responder to input word by word, so the interaction efficiency is low. Moreover, the form of text reply depends on text expression, and the amount of information carried is relatively limited.

For the above technical problems, the purpose of the present application is: when the responder replies to the target information displayed in an information display interface (for example: comment content, question content, message content, etc.), it can take advantage of a large amount of information carried by a video, so that the responder can reply to relevant content or answer a questioner's question in a form of video, thus, the reply content has a more obvious intention and carries more information, so that while improving the reply efficiency of the responder, it also makes it easier for the user to understand and obtain more information, and improving the user's use experience.

FIG. 1 is an application scenario diagram of an information interaction method according to an exemplary embodiment of the present disclosure. As shown in FIG. 1, the information interaction method provided by this embodiment can be applied to a scenario such as video playback. A user can trigger a video comment control corresponding to a played video (as shown in a video comment control 101 in FIG. 1) to enter a comment zone interface corresponding to the video, and then, in the comment zone interface, a video reply is made to a question asked by a questioner or a comment raised by a commentator.

Figure 2:
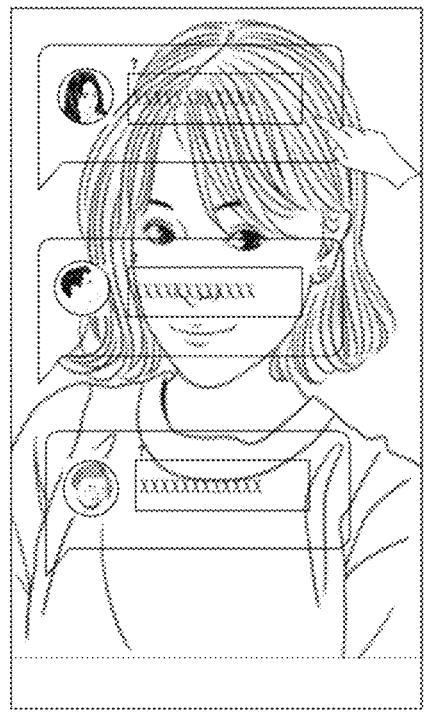
FIG. 2 is an application scenario diagram of an information interaction method according to another exemplary embodiment of the present disclosure.

FIG. 2 is an application scenario diagram of an information interaction method according to another exemplary embodiment of the present disclosure. As shown in FIG. 2, the information interaction method provided by this embodiment. can be applied to a live broadcast scenario, which can display stickers on a live broadcast interface and display question text or comment text in each sticker. The question or comment in the sticker may be acquired during the live broadcast or collected host before the live broadcast. During the live broadcast, the host can trigger a corresponding sticker in to current live broadcast interface to reply to the question or comment in the sticker by a video.

Figure 3:
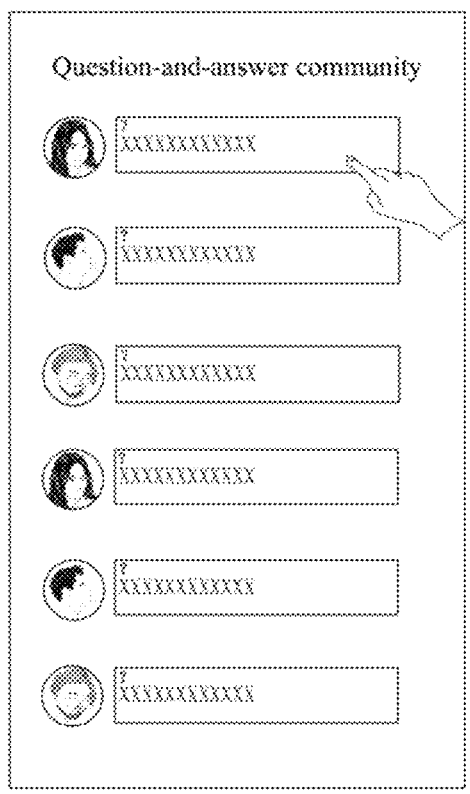
FIG. 3 is an application scenario diagram of an information interaction method according to yet another exemplary embodiment of the present disclosure.

FIG. 3 is an application scenario diagram of an information interaction method according to yet another exemplary embodiment of the present disclosure. As shown in FIG. 3, the information interaction method provided in this embodiment can also be applied to a question-and-answer community scenario. A questioner an publish his own question in a question-and-answer community interface and then a ponder can also answer the question raised by other users by a video in the question-and-answer community scenario.

Figure 4:
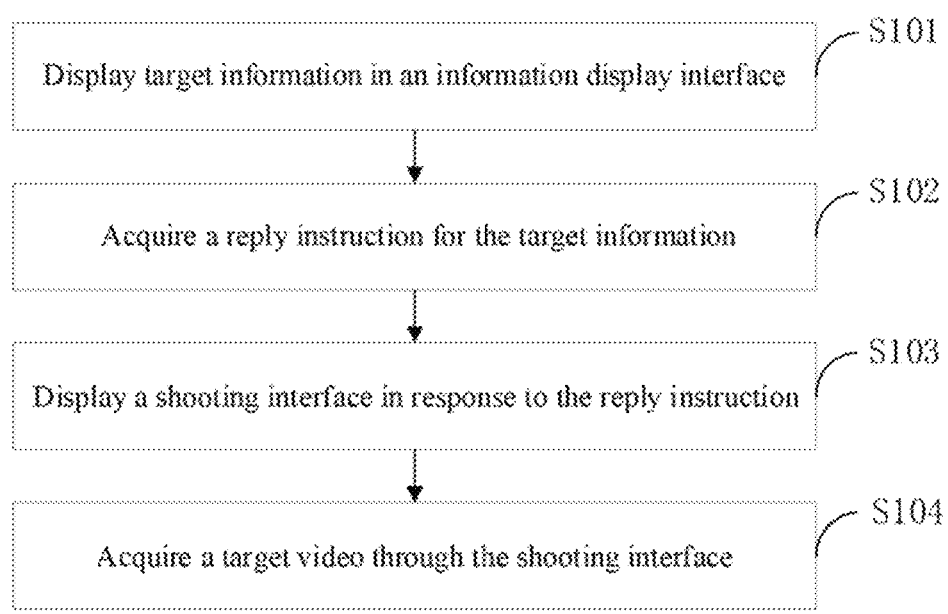
FIG. 4 is a schematic flowchart of an information interaction method according to an exemplary embodiment of the present disclosure.

FIG. 4 is a schematic flowchart of an information interaction method according to an exemplary embodiment of the present disclosure. As shown in FIG. 4, the information interaction method provided by the embodiment includes the following steps.

Step S101: display target information in an information display interface.

Specifically, at least one piece of target information is displayed in the information display interface. The information display interface may include a comment zone interface, an information aggregation area interface, a live broadcast interface, a question-and-answer community interface, etc. Correspondingly, the target information also include comment content, question content, message content, etc.

The comment zone interface may be used to display the comment content and the question content. For example, the comment zone interface may be used to display comment content for a current video and question content raised by a questioner for the current video.

The information aggregation area interface may be used to centrally display content the target information For example, the information aggregation area interface may be an interface for aggregating and displaying content of all questions related to a responder. Through the information aggregation area interface, all questions answered by the responder and all questions to be answered can be known.

For the live broadcast interface, it may be used to display question content and/or comment. content while displaying a live broadcast image. During a live broadcast, a host can select corresponding question content or comment to reply.

In addition, for the question and answer community interface, it may be used to display multiple different question contents, that is, question contents raised by different questioners will be displayed in the question-and-answer community interface, and the responder can make a video reply to a corresponding question by selecting a question in the question-and-answer community interface.

Step S102: acquire a reply instruction for the target information.

When the responder chooses to reply to the target information in the information display interface, it can trigger to reply control corresponding to the target information, or directly click the target information, or voice trigger the target information. In the present embodiment, a trigger mode of the target information and a display form of the target information are not limited.

Step S103: display a shooting interface in response to the reply instruction.

After triggering the target information, a camera of an electronic device can be called, and a corresponding shooting interface can be displayed to prompt the responder to shoot and reply.

Step S104: acquire a target video through the shooting interface.

After displaying the shooting interface, the responder can trigger a shooting control on the shooting interface to input a shooting instruction, so as to trigger shooting behavior to call the camera for shooting, and generate the target video used to reply to the target information.

In another implementation, the user can also trigger an upload control on the shooting interface to input an upload instruction, and then upload the target video used to reply to the target information.

In this embodiment, by acquiring the reply instruction acting on the target information in an information display interface, inputting a target video used to reply to the target information in a shooting interface, thereby making a video reply to the target information in the information display interface. Taking advantage of a large amount of information carried by a video, the reply content has a more obvious intention, so that while improving the reply efficiency of a responder, it also makes it easier for a user to understand and noire more information.

Figure 5:
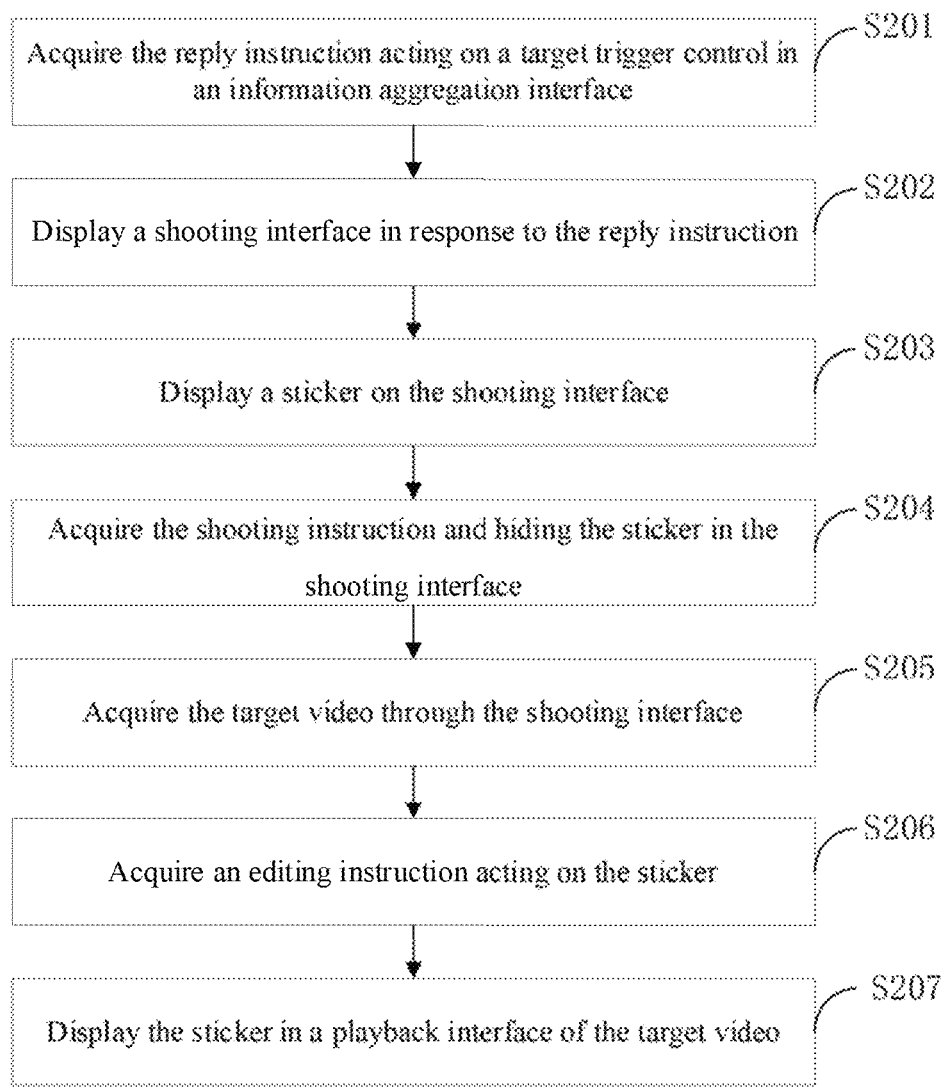
FIG. 5 is schematic flowchart of an information interaction method according to another exemplary embodiment of the present disclosure.

FIG. 5 is a schematic flowchart of an information interaction method according to another exemplary embodiment of the present disclosure. As shown in FIG. 5, the information interaction method provided by the embodiment includes the following steps.

Step S201: acquire the reply instruction acting on a target trigger control in an information aggregation interface.

Specifically, the information aggregation interface may include an interface for centrally displaying content of the target information. For example, the information aggregation interface may be an aggregation interface for displaying all question contents related to a responder. Through this interface, all questions answered by the responder and all questions to be answered can be known. In an implementation, in the information aggregation zone interface, sorting can be done according to a number of likes of each question, and questions to be answered can be displayed first, that is, the questions to be answered are displayed in the from of the interface.

Figure 6:
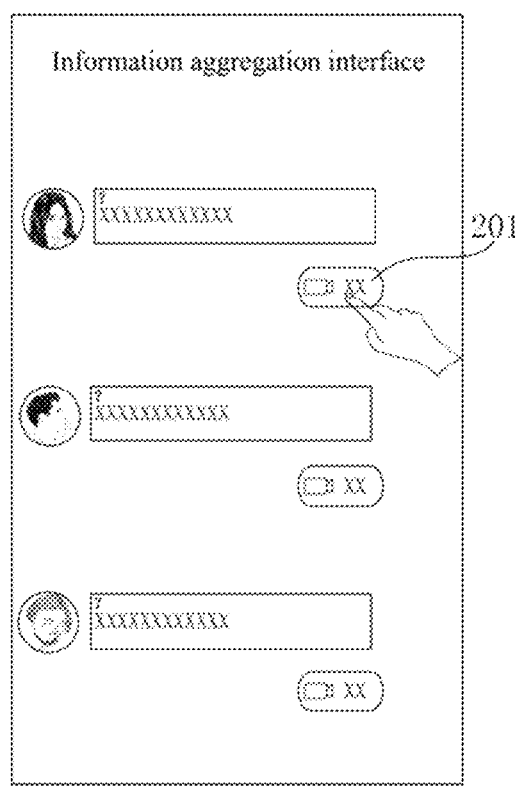
FIG. 6 is a schematic interface diagram of an information aggregation interface in the embodiment shown in FIG. 5.

FIG. 6 is a schematic interface diagram of an information aggregation interface in the embodiment shown in FIG. 5. As shown in FIG. 6, in this step, the reply instruction acting on the target trigger control in the information aggregation interface can be acquired (as shown in a target trigger control 201 in FIG. 6), where the target trigger control is used to instruct to reply to a corresponding target question.

Figure 7:
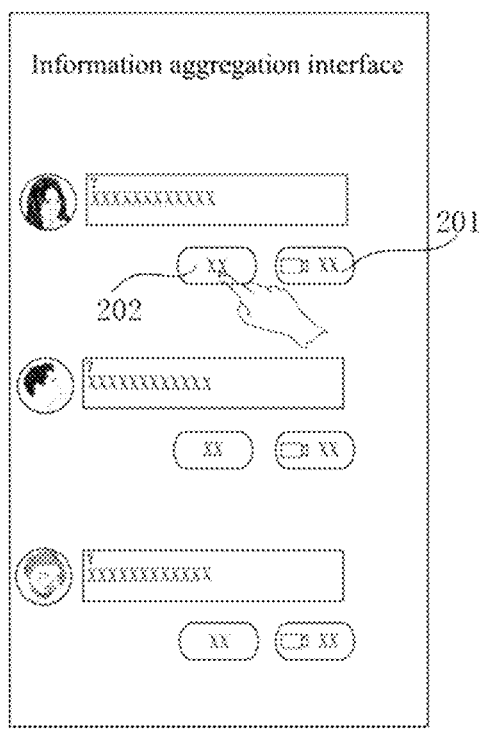
FIG. 7 is another schematic interface diagram of an information aggregation interface in the embodiment shown in FIG. 5.

In addition, FIG. 7 is another schematic interface diagram of an information aggregation interface in the embodiment shown in FIG. 5. The interface shown in FIG. 7 can display the target information, such as a target question, and can also display a target trigger control and an edit control (as shown in a target trigger control 201 and an edit control 202 in FIG. 7). For example, as shown in FIG. 7, in addition to triggering the target trigger control for video reply, a corresponding question can also be deleted, translated and linked to an original comment zone by triggering the edit control.

Step S202: display a shooting interface in response to the reply instruction.

Figure 8:
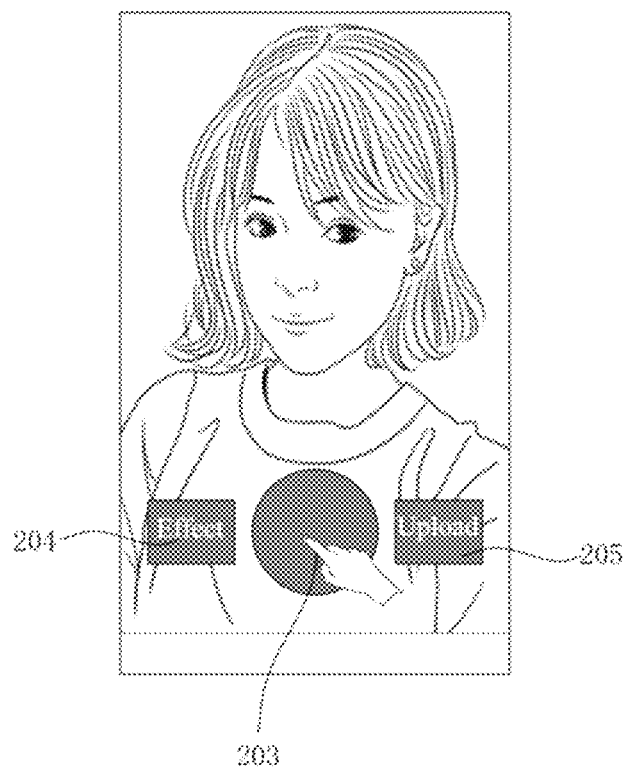
FIG. 8 is a schematic interface diagram of a shooting interface in the embodiment shown in FIG. 5.

Continuing to refer to FIG. 6-FIG. 7, a target control corresponding to the target question in the information aggregation interface is triggered to input the reply instruction to enter the shooting interface. FIG. 8 is a schematic interface diagram of a shooting interface in the embodiment shown in FIG. 5. As shown in FIG. 8, in this interface, the user can directly trigger a shooting control (as shown in a shooting control 203 in FIG. 8 to call the camera for shooting; in addition, the user can also select an effect of video shooting or add corresponding special effects by triggering an effect control (as shown in an effect control 204 in FIG. 8). Moreover, the user can also upload the, corresponding video by triggering an upload control (as shown in an upload control 205 in FIG. 8). For example, the user can select a single video to upload or select multiple videos to upload.

Step S203: display a sticker on the shooting interface.

Figure 9:
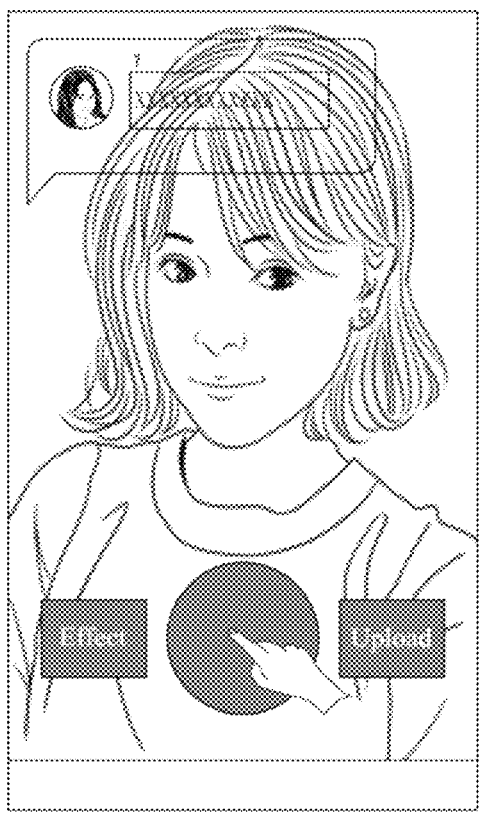
FIG. 9 another schematic interface diagram of a shooting interface in be embodiment shown in FIG. 5.

On the basis of displaying the shooting interface, FIG. 9 is another schematic interface diagram of a shooting interface in the embodiment shown in FIG. 5. As shown in FIG. 9, the sticker can also be displayed on the shooting interface, where the sticker is used to accommodate the target information. Among them, the sticker can also be used to accommodate a preset identification, where the preset identification is used to identify an information type of the target information. Continuing to refer to FIG. 9, a "question mark" can be displayed to indicate that content displayed in a current sticker is question information. Therefore, by displaying a form of sticker on the shooting interface, question content currently answered by the responder can be prompted in the shooting interface. Moreover, a style of the sticker can be automatically generated according to a text corresponding to a user's avatar and the target information. For the avatar, it can be a placeholder image. When download duration exceeds an upper limit or a download fails, the placeholder image is used to generate the sticker. For a font size of the generated sticker, there is a default font size. When the number of lines exceeds a preset number of lines, for example, when it exceeds 6 lines, the font size is adjusted.

In addition, in the shooting interface, the sticker can be displayed in a semi-transparent state, and in this state, the sticker cannot be moved. When the user operates the sticker, a prompt can be given to prompt the user to edit the sticker after the target video is generated. Moreover, the sticker can be set on a top layer of the interface, so that it cannot be affected by special effects and fillets. Therefore, the sticker can always exist in the shooting interface. That is, while displaying the sticker, special effects can be used normally, such as filter, beauty, flip camera, countdown, fast and slow speed, flash and other functions, without. affecting the display of the sticker.

Step S204: acquire the shooting instruction and hiding the sticker in the shooting interface.

Continuing to refer to FIG. 9, after the shooting control is triggered in FIG. 9, the sticker is hidden in the shooting interface, where the sticker may remain hidden after clicking the shooting control for shooting. For a shooting scenario of multiple videos, the sticker may be hidden in the shooting interface when shooting each segment after shooting.

Step S205: acquire the target video through the shooting interface.

After the shooting interface is displayed, the user can trigger the shooting control on the shooting interface to input the shooting instruction, as to call the camera to shoot the target video used to reply to the target information.

In another implementation, the user can also trigger the upload control on the shooting interface to input the upload instruction, and then upload the target video used to reply to the target information.

Figure 10:
FIG. 10 is a schematic interface diagram of a target video the embodiment shown in FIG. 5.

FIG. 10 is a schematic interface diagram of a target video in the embodiment shown in FIG. 5. As shown in FIG. 10, after the target video is acquired, the sticker can continue to be displayed on a cover of the target video, so that video content and target information content (for example, target question) in the sticker forma a corresponding relationship.

Step S206: acquire an editing instruction acting on the sticker.

After the girt et video is generated, the editing instruction can be input to the sticker to edit the sticker. Specifically, the editing instruction is used to adjust a display feature of the sticker on a video cover corresponding to the target video. The display feature includes at least one of as display zone position, a display zone area, a display teat feature and a sticker style.

Figure 11:
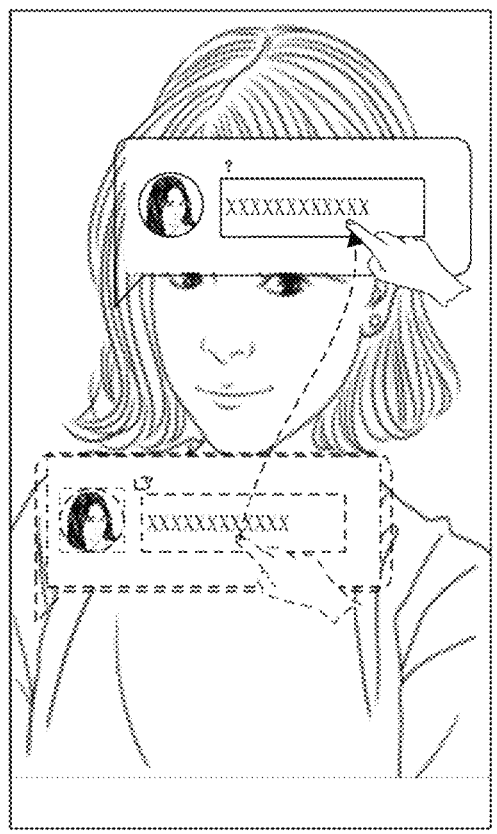
FIG. 11 is a schematic interface diagram for editing a sticker in the target video shown in FIG. 10.

FIG. 11 is a schematic diagram of the interface for editing a sticker in the target video shown in FIG. 10. As shown in FIG. 11, the user can change a position of the sticker in the video by dragging the sticker.

Step S207: display the sticker in a playback interface of the target video.

After the responder publishes the target video, the sticker will continue to be displayed in the playback interface when the target video is subsequently played, so that a viewer can establish a corresponding relationship between the video content and specific target information content (for example, target question).

In addition, during a playback of the target video, if the user triggers the sticker in the playback interface, it will jump to the information aggregation interface and display the target question in a top zone of the information aggregation interface. Refer to FIG. 6 or FIG. 7, where the top zone of the information aggregation interface can be a display position of first target information in FIG. 6 or FIG. 7.

Figure 12:
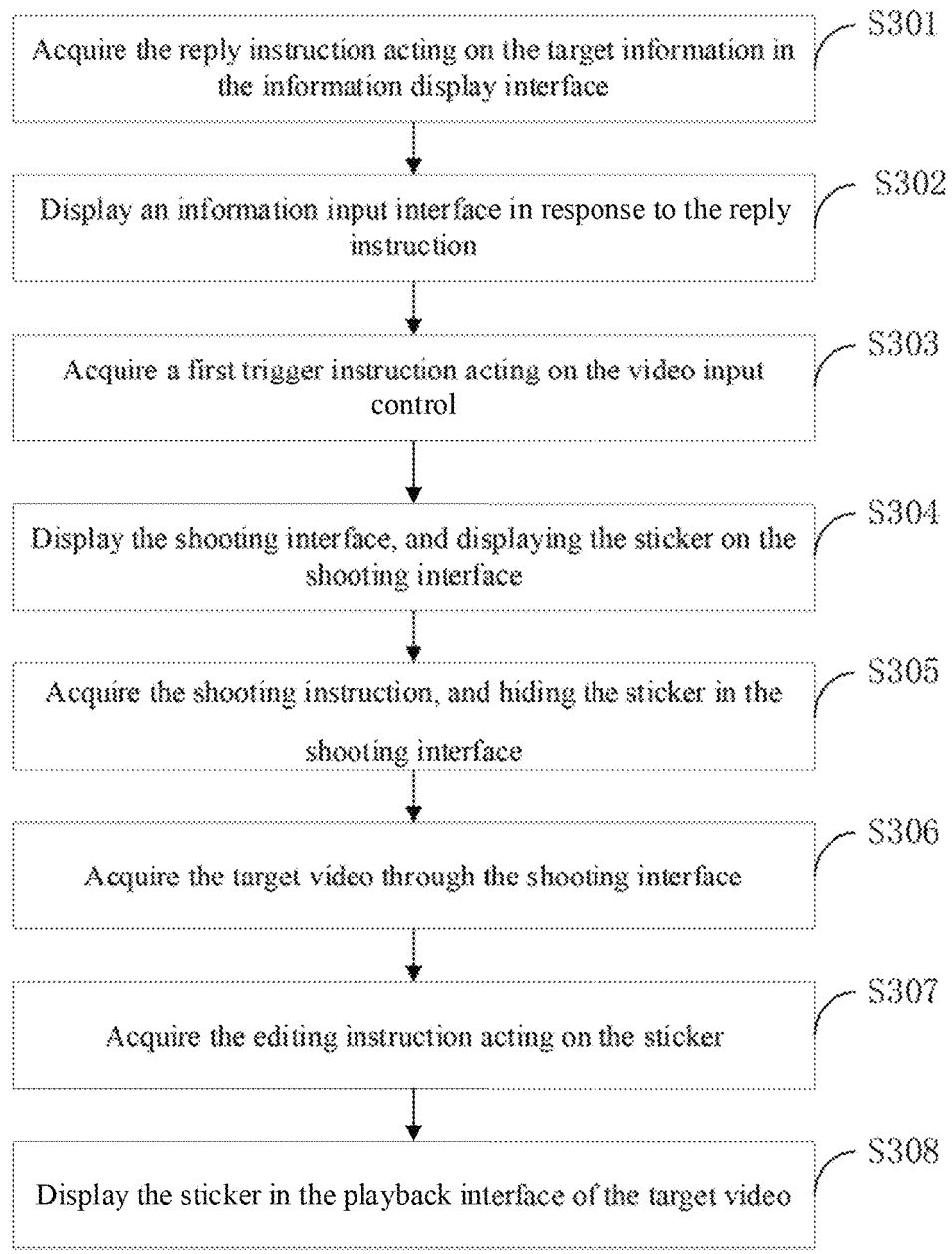
FIG. 12 is a schematic flowchart of an information interaction method according to yet another exemplary embodiment of the present disclosure.

FIG. 12 is a schematic flowchart of an information interaction method according to yet another exemplary embodiment of the present disclosure. As shown in FIG. 12, the information interaction method provided by the embodiment includes the following steps.

Step S301: acquire the reply instruction acting on the target information in the information display interface.

Specifically, the information e display interface may be a comment zone interface, where the comment zone interface is o display comment content and question content.

Figure 13:
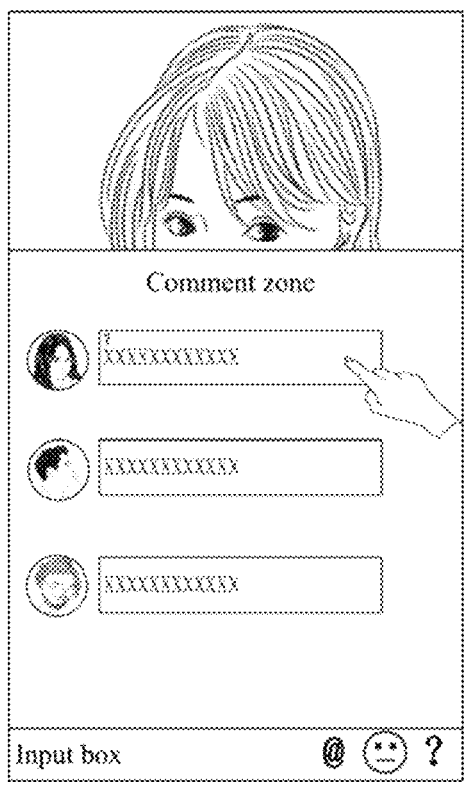
FIG. 13 is a schematic interface diagram of a comment zone interface in the embodiment shown in FIG. 12.

FIG. 13 is a schematic interface diagram of a comment zone interface in the embodiment shown in FIG. 12. As shown in FIG. 13, comment content and question content can be displayed in the comment zone interface. In order to distinguish the question content from ordinary comment content, a preset identification can be displayed in a display zone of the target question, where the preset identification is used to identify an information type of the target information. Continuing to refer to FIG. 13, the target question can be identified by a preset identification "question mark".

Step S302: display an information input interface in response to the reply instruction.

The user can trigger the target question in the comment zone interface, so as to jump to the information input interface. In the information input interface, the target question can be replied by inputting a video, or the target question can be replied in a form of traditional input text.

Figure 14:
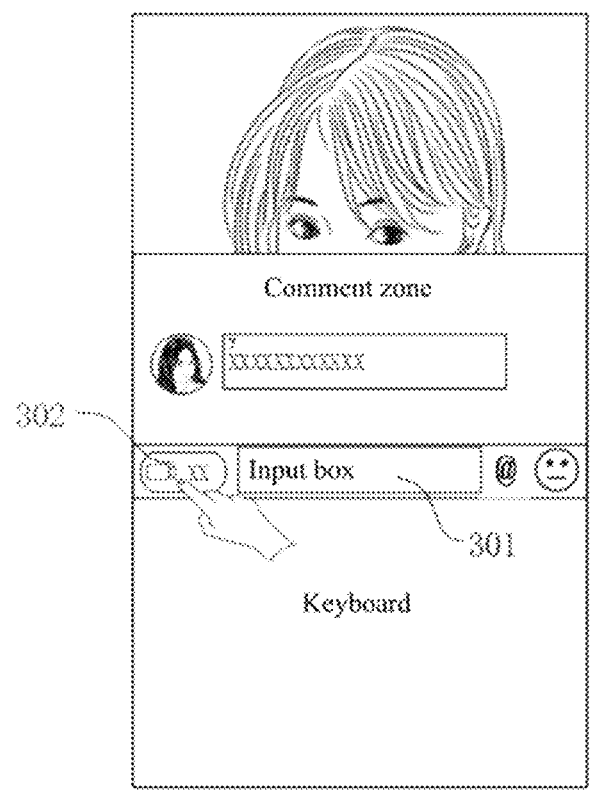
FIG. 14 is a schematic interface diagram of video reply on an information input interface in the embodiment shown in FIG. 12.

FIG. 14 is a schematic interface diagram of video reply on be information input interface in the embodiment shown in FIG. 12. As shown in FIG. 14, the information Input interface includes a text input box and a video input control (as shown its a text input box 301 and a video input control 302 in FIG. 14). The video input control can be used to display an icon and a corresponding text prompt, such as "video reply", so as to prompt the user that control can be triggered to make a video reply.

Figure 15:
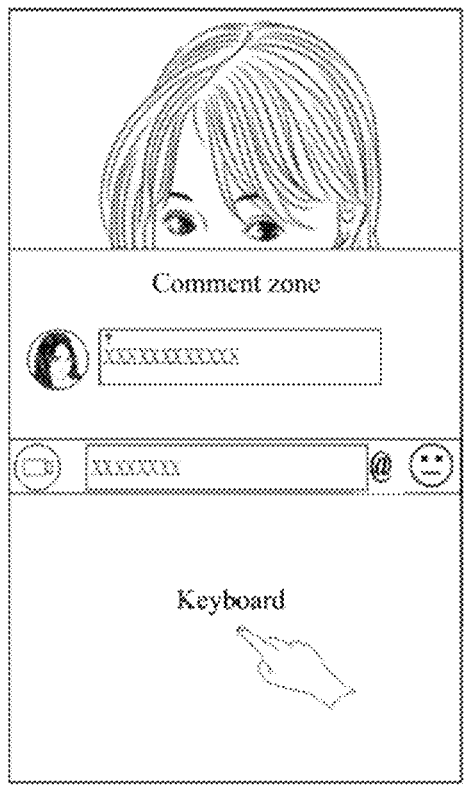
FIG. 15 is a schematic interface diagram of text reply on an information input interface in the embodiment shown in FIG. 12.

Continuing to refer to FIG. 14, since the video input control is used to display the icon and the corresponding text prompt, more information needs to be displayed. Therefore, the control will occupy a larger area in the information input interface, so that the text input box displayed side, by side is narrow, affecting an effect experience of text input. FIG. 15 is a schematic interface diagram of text reply on an information input interface irk the embodiment shown in FIG. 12. As shown in FIG. 15, the user can also make a text reply to the target information in a form of text input through a keyboard. When it is detected that text is input in the text input box, the video input control is displayed in a reduced size. For example, the text prompt in the video input control can be cancelled, so as to expand a scope of the text input box to improve the user's experience of text input.

Step S303: acquire a first trigger instruction acting on the video input control.

Step S304: display the shooting interface, and displaying the sticker on the shooting interface.

Step S305: acquire the shooting instruction, and hiding the sticker in the shooting interface.

Step S306: acquire the target video through the shooting interface.

Step S307: acquire the editing instruction acting on the sticker.

Step S308: display the sticker in the: playback interface of the target video.

In the interface shown in FIG. 14, by triggering the video input control, the shooting interface can be called, and then use the shooting interface to input a video. Continuing to refer to FIG. 8, in this interface, the user can directly trigger a shouting control (as shown in a shooting control 203 in FIG. 8) to call the camera for shooting; in addition, the user can also select an effect of video shooting or add corresponding special effects by triggering an effect control (as shown in an effect control 204 in FIG. 8). Moreover, the user can also upload the corresponding video by triggering an upload control (as shown in an upload control 205 in FIG. 8). For example, the user can select a single video to upload or select multiple videos to upload.

Continuing to refer to FIG. 9, the sticker can also be displayed on the shooting interface, where the sticker is used to accommodate the target information. Among them, the sticker can also be used to accommodate a preset identification, the preset identification is used to identify an information type of the target information. Continuing to refer to FIG. 9, a "question mark" can be displayed to indicate that content displayed in a current sticker is question information. Therefore, by displaying a form of sticker on the shooting interface, question content currently answered by the responder can be prompted in the shooting interface. Moreover, a style of the sticker can be automatically generated according to a text corresponding to a user's avatar and the target information. For the avatar, when duration of downloading the user's avatar exceeds an upper limit or a download fails, a placeholder image can be used to replace the user's avatar for display on the sticker. In addition, a default font size can be set for the font size of the generated sticker. When the number of lines exceeds a preset number of lines, for example, when it exceeds 6 lines, the font size can be adjusted.

In addition, in the shooting interface, the sticker can be displayed in a semi-transparent state, and in this state, the sticker cannot be moved. When the user operates the sticker, a prompt can, be given to prompt the user to edit the sticker after the target video is generated. Moreover, the sticker can be set on a top layer of the interface, so that it cannot be affected by special effects and filters. Therefore, the sticker can always exist in the shooting interface. That is, while displaying the sticker, special effects can be used normally, such as filter, beauty, flip camera, countdown, fast and slow speed, flash and other functions, without affecting the display of the sticker.

After the shooting control is triggered in FIG. 9, the sticker can be hidden in the shooting interface, where the sticker may remain hidden after clicking the shooting control for shooting. For a shooting scenario of multiple videos, the sticker may be hidden in the shooting interface when shooting each segment after shooting.

After the shooting interface is displayed, the user can trigger the shooting control on the shooting interface to input the shooting instruction, so as to call the camera to shoot the target video used to reply to the target information.

In another implementation, the user can also trigger the upload control on the shooting interface to input the upload instruction, and then upload the target video used to reply to the target information.

Continuing to refer to FIG. 10, after the target video is acquired, the sticker can continue to be displayed on a cover of the target video, so that video content and target information content (for example, target question) in the sticker form a corresponding relationship.

After the target video is generated, the editing instruction can be input to the sticker to edit the sticker. Specifically, the editing instruction is used to adjust a display feature of the sticker on a video cover corresponding to the target video. The display feature includes at least one of a display zone position, a display zone area, a display text feature and a sticker style.

Continuing to refer to FIG. 11, the user can also change a position of the sticker in the video by dragging the sticker.

After the responder publishes the target video, the sticker will continue to be displayed in the playback interface when the target video is played, so that a viewer can establish a corresponding relationship between the video content and specific target information content (for example, target question or target comment information).

Figure 16:
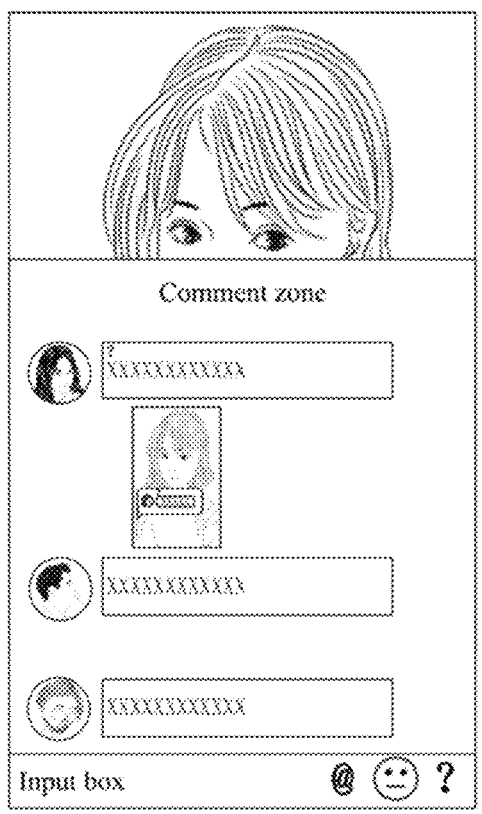
FIG. 16 is another schematic interface diagram of a comment zone interface in the embodiment shown in FIG. 12.

FIG. 16 is another schematic interface diagram of a comment zone interface in the embodiment shown in FIG. 12. After the responder publishes the target video, a video cover of the target video can be displayed at a first target position of the information display interface, where the first target position is located in an information reply zone corresponding to the target information.

Figure 17:
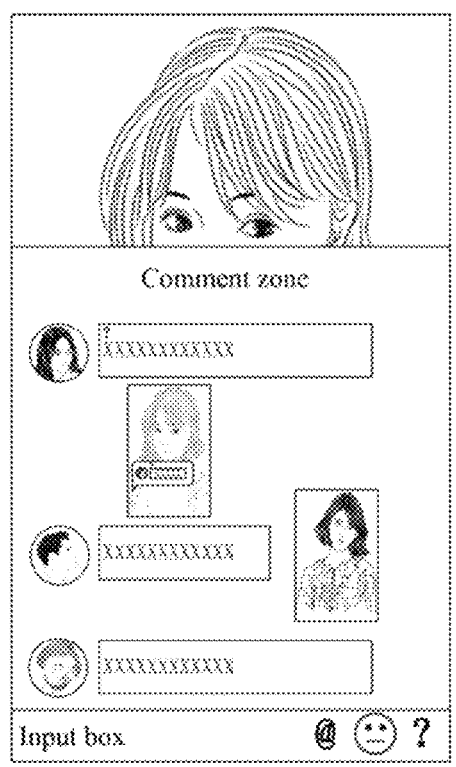
FIG. 17 is a schematic interface diagram of a question entrance in an information interaction method according to an exemplary embodiment.

On the basis of FIG. 16, FIG. 17 is yet another schematic interface diagram of a comment zone interface in the embodiment shown in FIG. 12. After the responder publishes the target video, a video cover of an original video is displayed at a second target position of the information display interface, where the target information is information generated for the original video.

In order to distinguish functions of the first target position (for example, it can be below a target information display position) and the second target position (for example, it can be to a right of the target information display position), the first target position can be understood as a reply video display position that replies to the target information, the second target position can be understood as an original object video display position proposed by the target information, that is, the target information is proposed for content in the original object video.

Figure 18:
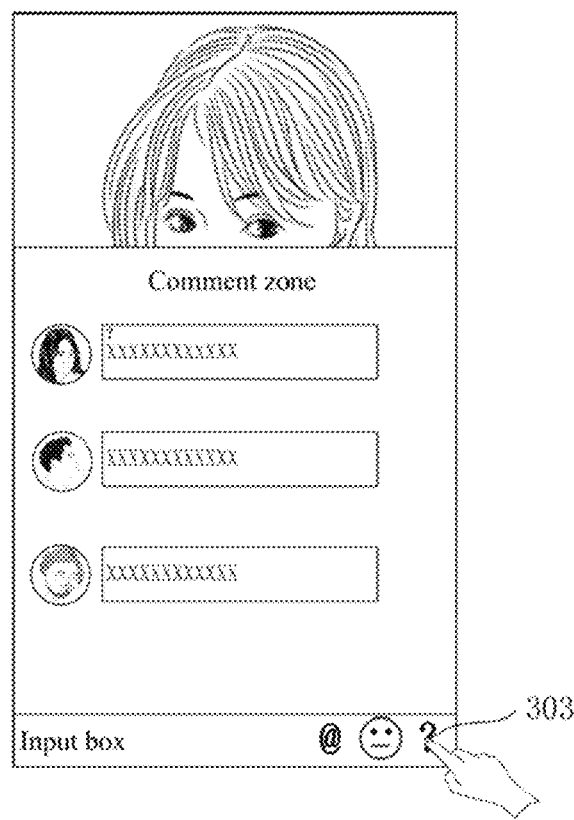
FIG. 18 is another schematic interface diagram of a question entrance in an information interaction method according to an exemplary embodiment.

FIG. 18 is a schematic interface diagram of a question entrance in an information interaction method according to an exemplary embodiment. As shown in FIG. 18, the user can enter a question interface by triggering a question control (as shown in a question control 303 in FIG. 18) the comment zone interface to input a target question. Among them, when the user expands a video comment panel that can ask questions for a first time, a novice guidance bubble can also be displayed to guide the user to ask questions. The prompt bubble disappears after the user clicks any position or displays for a preset time, and the bubble can be displayed only once.

In addition, before acquiring a question instruction acting on the question control in the information display interface, a permission opening, instruction can also be acquired, so that the permission opening instruction is used to open the question control. If a current user has turned on a questionand-answer function, the question text and comment text can be displayed directly in the information display interface, and questions can be asked at this moment. When the user does not turn on the question-and-answer function, a prompt text and a hyperlink can be displayed in the information display interface, where the prompt text is used to prompt to start the question-and-answer function, and the hyperlink is used to jump to a question-and-answer function setting interface.

Specifically, after the question-and-answer function is turned on in die question-and-answer function setting interface, a relevant prompt of successful startup can be displayed on a current page. Moreover, after the question-and-answer function is turned on, a user's personal homepage interface displays a question entrance, so that all public videos can be asked or commented in the interface.

The question-and-answer function can also be turn off in the question-and-answer function setting interface. It is worth noting that after clicking close, a second pop-up window is required to ask the user whether to confirm closing. After closing successfully, the question entrance will no longer appear on the user's homepage interface and comment zone interface. However, existing questions in the comment zone interface are still displayed. In addition, when the question-and answer function is turned Wand turned on again, a previous historical question list, like information and answer information will also be restored.

After the question-,and-answer function is turned on, the question instruction acting on the question control in the information display interface can be acquired, and then, in response to the question instruction, the target question is acquired and the target question is displayed in the information display interface. The information display interface may be a comment zone interface or a personal homepage interface. Users can ask a video creator a question by triggering the question control in the comment zone interface or the personal homepage interface.

Figure 19:
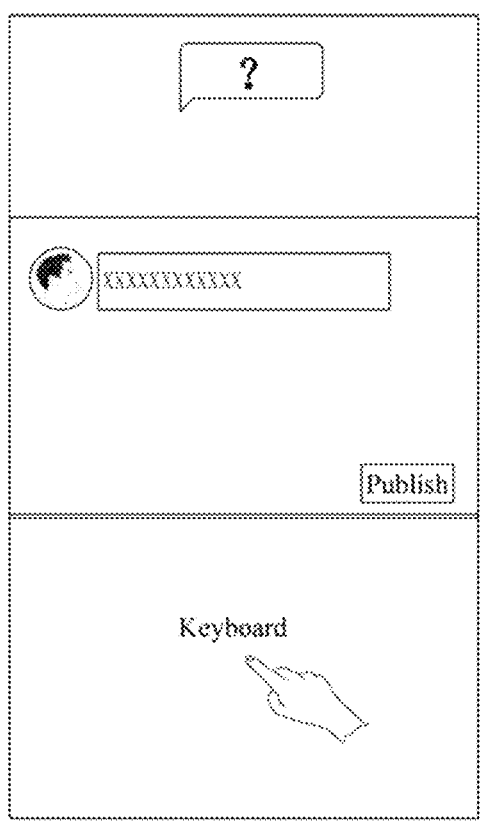
FIG. 19 is a schematic interface diagram of a question interface in an information interaction method according to an exemplary embodiment.

FIG. 19 is a schematic interface diagram of a question interface in an information interaction method according to an exemplary embodiment. As shown in FIG. 19, after triggering the question control in FIG. 18, the question interface can be jumped to. In the question interface, questions can be input through a keyboard, so as to realize the question function for the video creator. In addition, a preset identification for identifying a current interface as a question interface can be displayed in the interface, for example, it may be a "question mark" shown in FIG. 19.

Figure 20:
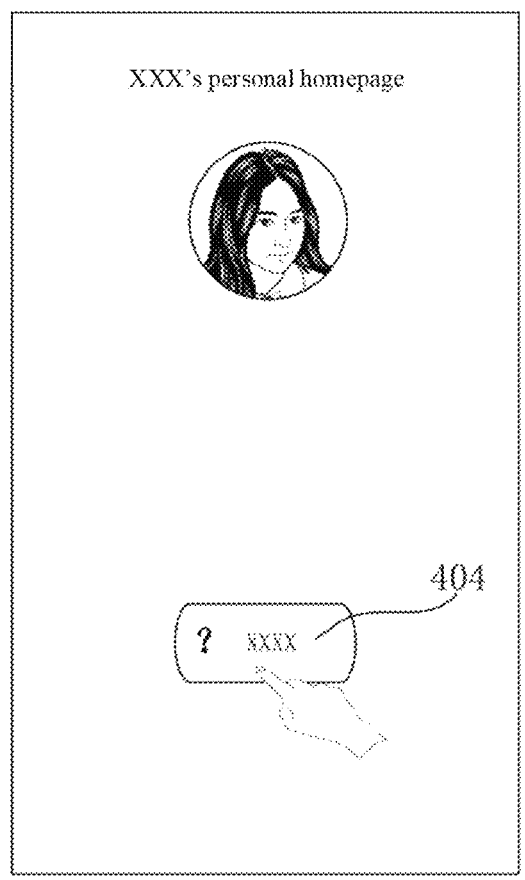
FIG. 20 is another schematic interface diagram of an information display entrance in an information interaction method according to an exemplary embodiment.

FIG. 20 is another schematic interface diagram of an information display entrance in an information interaction method according to an exemplary embodiment. As shown in FIG. 20, the user homepage interface is used to display user information, and a first jump control (as shown in a first jump control 404 in FIG. 20) can be set in the interface to jump to the information aggregation interface. Thus, in the user homepage interface for displaying the user information, the first jump control is triggered to jump, so as to jump to display the information aggregation interface as shown in FIG. 6. Then the target information is replied by acquiring the reply instruction acting on a target trigger control in the information aggregation interface, and acquiring the target video through the shooting interface, where the target trigger control is used to instruct to reply to corresponding target information.

Figure 21:
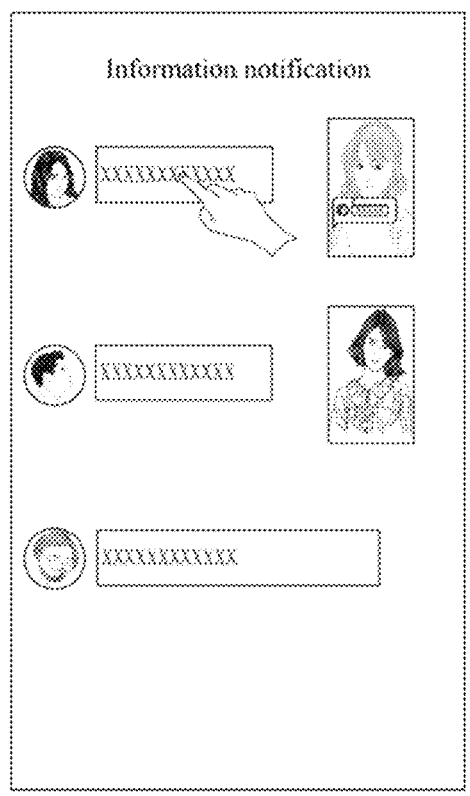
FIG. 21 is a schematic interface diagram of an information notification interface in an information interaction method according to an exemplary embodiment.

FIG. 21 is a schematic interface diagram of art information notification interface in an information interaction method according to an exemplary embodiment. As shown in FIG. 21, the information notification interface is displayed, where the information notification interface is used to display at least one piece of notification information, and a second jump control is set on the information notification interface (as shown in FIG. 21, the target information itself can be set as a jump control). When a second jump instruction acting on the information notification interface is acquired, then jump to display the information aggregation interface as shown in FIG. 6. Then the target information is replied by acquiring the reply instruction acting on a target trigger control in the information aggregation interface, and acquiring the target video through the shooting interface, where the target trigger control is used to instruct to reply to corresponding target information.

In an embodiment, after other users comment, ask question or like a video, the video creator of the video can receive corresponding notification information, and the video creator can click the notification information or a notification mark corresponding to the notification information to enter the information notification interface. At the same time, content of other users' comments, questions or likes on the above videos can be ranked first for highlighting display. In addition, when the video creator replies to a comment or a question in a form of video, a sender of the question and a user who likes the question can receive a notification in their respective information notification interface, click the notification to open a corresponding video details page. In addition, in the information notification interface, different types of information can be displayed separately by inputting a screening instruction, that is, only target type information that meets screening conditions is displayed in a station notification interface according to the screening instruction. The information type may include: a notification that a question is received, a notification that a question is answered, a notification that a question is replied, a notification that a liked question is answered, etc.

In another embodiment, when a current interface displayed to the user is an interface for displaying the target information (an interface other than the information aggregation interface, that is, the current interface is any type of interface other than the information aggregation interface among interface types included in the information display interface), the user can trigger the target information in the current interface. In response to a trigger instruction for the target information in the current interface, jump from the current interface and display the information aggregation interface. The target information can be displayed in a top zone of the information aggregation interface, which can refer to FIG. 6 or FIG. 7. The top zone of the information aggregation interface can be a display position of first target information in FIG. 6 or FIG. 7. In this embodiment when the target information is triggered in the current interface, jump from the current interface to the information aggregation interface, and display the triggered target information in the top zone of the jumped information aggregation interface to highlight display of the target information, so as to facilitate the user to locate and consult the target information.

Figure 22:
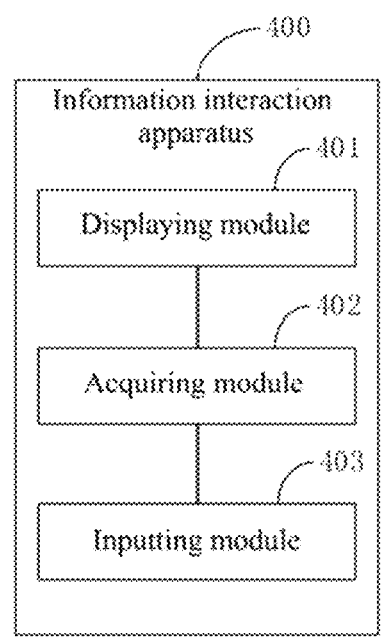
FIG. 22 is a schematic structural diagram of an information interaction apparatus according to an exemplary embodiment of the present disclosure.

FIG. 22 is a schematic structural diagram of an information interaction apparatus according to an exemplary embodiment of the present disclosure. As shown in FIG. 22, the information interaction apparatus 400 provided by the present embodiment includes: a displaying module 401, configured to display target information in an information display interface; an acquiring module 402, configured to acquire a reply instruction for the target information; the displaying module 401 is further configured to display a shooting interface in. response to the reply instruction; and an inputting module 403, configured to acquire a target video through the shooting interface, where the target video is used to reply to the target information.

According to one or more embodiments of the present disclosure, the displaying module 401 is further configured to display a video cover of the target video at a first target position of the information display interface, where the first target position is located in an information reply zone corresponding to the target information.

According to one or more embodiments of the present disclosure, a preset identification is displayed in a display zone of the target information, and the preset identification is used to identify an information type of the target information.

According to one or more embodiments of the present disclosure, the displaying module 401 is further configured to display a video cover of an original video at a second target position of the information display interface, where the target information is information generated for the original video.

According to one or more embodiments of the present disclosure, the information display interface includes an information aggregation interface, the information aggregation interface for is used to display at least one piece of target information, where each piece of target information is provided with a corresponding trigger control, the acquiring module 402 is further configured to acquire the reply instruction acting on a target trigger control in the information aggregation interface, where the target trigger control is used to instruct to reply to corresponding target information.

According to one or more embodiments of the present disclosure, the displaying module 401 is further configured to display an user homepage interface, where the user homepage interface is used to display user information; the acquiring module 402 is further configured to acquire a first jump instruction acting on a first jump control in the user homepage interface; and the displaying module 401 is further configured to jump to display the information aggregation interface in response to the first jump instruction.

According to one or more embodiments of the present disclosure, the displaying module 401 is further configured to display an information notification interface, where the information notification interface is used to display at least one piece of notification information; the acquiring module 402 is farther configured to acquire a second jump instruction acting on a second jump control in the information notification interface; and the displaying module 401 is further configured to jump to display the information aggregation interface in response to the second jump instruction.

According to one or more embodiments of the present disclosure, the acquiring module 402 is further configured to acquire a question sticker, where the question sticker is used to accommodate the target information; and the displaying module 401 is further configured to display the question sticker in the live broadcast interface and acquire the reply instruction acting on the question sticker.

According to one or more embodiments of the present disclosure, the information display interface includes a question-and-answer community interface, the question-and-answer community interface is used to display at least one piece of target information, and the acquiring module 402 is further configured to acquire the reply instruction acting on the target information in the question-and-answer community interface.

According to one or more embodiments of the present disclosure, the displaying module 401 is further configured to display an information input interface in response to the reply instruction, where the information input interface includes a text input box and a video input control; and the acquiring module 402 is further configured to acquire a first trigger instruction acting on the video input control, where the first trigger instruction is used to call the shooting interface.

According to one or more embodiments of the present disclosure, the displaying module 401 is further configured to display the video input control in a reduced size if it is detected that text is input in the text input box.

According to one or more embodiments of the present disclosure, the acquiring module 402 is further configured to acquire a second trigger instruction acting on the target information in a current interface, where the current interface is any type of interface other than an information aggregation interface among interface types included in the information display interface, and the information aggregation interface is used to display at least one piece of target information; the displaying module 401 is further configured to jump to display the information aggregation interface in response to the second trigger instruction, and the target information is displayed in a top zone of the information aggregation interface.

According to one or more embodiments of the present disclosure, the acquiring module 402 is specifically configured to: call a camera to shoot the target video in response to a shooting instruction acting on the shooting interface; or, upload the target video in response to an upload instruction acting on the shooting interface.

According to one or more embodiments of the present disclosure, the displaying module 401 is further configured to display a sticker on the shooting interface, where the sticker is used to accommodate the target information.

According to one or more embodiments of the present disclosure, the sticker is further used to accommodate a preset identification, where the preset identification is used to identify an information type of the target information.

According to one or more embodiments of the present disclosure, the acquiring module 402 is further configured to acquire an editing instruction acting on the sticker, where the editing instruction is used to adjust a display feature of the sticker on a video cover corresponding to the target video, where the display feature includes at least one of a display zone position, a display zone area, a display text feature, and a sticker style.

According to one or more embodiments of the present disclosure, the displaying module 401 is further configured to display the sticker in a playback interface of the target video.

It is worth noting that the information interaction apparatus provided by the embodiment shown in FIG. 22 can be configured to execute the method provided by any of the above embodiments. The specific implementation method is similar to technical effect, and will not be repeated here.

Figure 23:
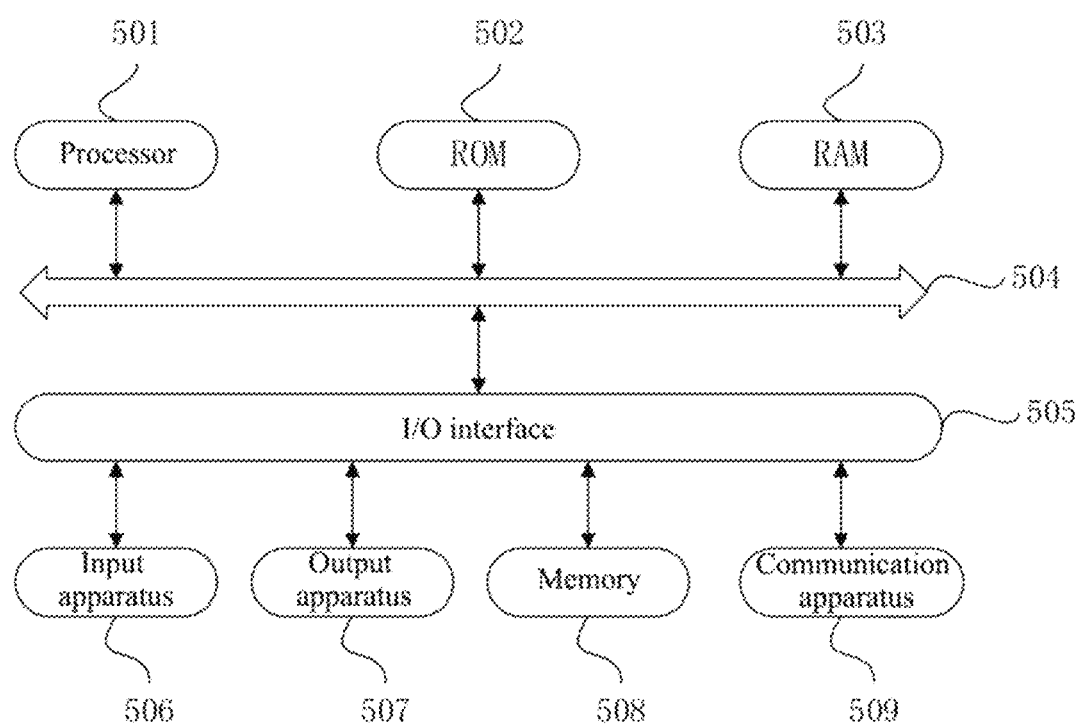
FIG. 23 is a schematic structural diagram of an electronic device according to an exemplary embodiment of the present disclosure.

FIG. 23 is a schematic structural diagram of an electronic device according to an exemplary embodiment of the present disclosure. As shown in FIG. 23, it shows a schematic structural diagram of an electronic device 500 suitable for implementing the embodiments of the present disclosure. The electronic device in the embodiments of the present disclosure may include, but is not limited to, mobile terminals with an image acquisition function such as a mobile phone, a laptop, a digital broadcast receiver, a personal digital assistant (PDA), a portable android device (pad), a portable media player (PMP), an in-vehicle terminal (for example, in-vehicle navigation terminal), a wearable electronic device and fixed terminals with an image acquisition device such as a digital television (Television, TV), a desktop computer, a smart home device, etc. The electronic device shown in FIG. 23 is only an example and should not bring any limitation to the function, and scope of use of the embodiments of the present disclosure.

As shown in FIG. 23, the electronic device 500 may include a processor (such as a central processing unit, a graphics processor, etc.) 501, which may execute various appropriate actions and processes according to a program stored in a read only memory (ROM) 502 or a program loaded from a memory 508 into a random access memory (RAM) 503. Various programs and data required for an operation of the electronic device 500 are also stored in the RAM 503. The processor 501, the ROM 502 and the RAM 503 are connected to each other through a bus 504. An input/output (I/O) interface 505 is also connected to the bus 504. The memory is used to store a program for executing the method described in above method embodiments, the processor is configured to execute the program stored in the memory to implement the functions of the embodiments of the present disclosure described above and/or other desired functions.

Generally, the following apparatus can be connected to the I/O interface 505; an input apparatus 506 including, for example, a touch screen, a touch pad, a keyboard, a mouse, a camera, a microphone, an accelerometer, a gyroscope, etc.; an output apparatus 507 including, for example, a liquid crystal display (LCD), a speaker, a vibrator, etc.; a storage device 508 including, for example, a magnetic tape, a hard disk, etc.; and a communication apparatus 509. The communication apparatus 509 may allow the electronic device 500 to perform wirelessly or wired communication with other devices to exchange data. Although FIG. 23 shows the electronic device 500 having various apparatuses, it should be understood that it is not required to implement or have all the apparatuses shown. More or fewer apparatuses may alternatively be implemented or provided.

In particular, according to an embodiment of the present disclosure, a process described above with reference to a flowchart may be implemented as a computer software program. For example, an embodiment of the present disclosure includes a computer program product including a computer program carried on a non-transitory computer-readable medium, and the computer program includes a program code for executing the method shown in the flowchart of the embodiment of the present disclosure. In such an embodiment, the computer program may be downloaded and installed from a network through the communication apparatus 509, or installed from the storage apparatus 508, or installed from the ROM 502. When the computer program is executed by the processor 501, the above functions defined the method of the embodiment of the present disclosure are executed.

It should be noted that the above computer-readable medium of the present disclosure may be it computer-readable signal medium or a computer-readable storage medium, or any combination of the above two. The computer-readable storage medium may be, for example, but is not limited to, an electrical, a magnetic, an optical, an electromagnetic, an infrared, or a semiconductor system, apparatus, or device, or any combination of the above. More specific examples of computer-readable storage media may include, but are not limited to, an electrical connection with one or more wires, a portable computer disk, a bard disk, an random access memory (RAM), an read only memory (ROM), an erasable programmable read only memory (EPROM or flash memory), an optical fiber, a compact disc-read only memory (CD-ROM), an optical storage device, a magnetic storage device, or any suitable combination of the above. In the present disclosure, the computer-readable storage medium may be any tangible medium containing or storing a program, the program may be used by or in combination with an instruction execution system, apparatus or device. In the present disclosure, the computer-readable signal medium may include a data signal propagated in a baseband or as part of a carrier wave, in which the computer-readable program code is carried. This propagated data signal can take many forms, including but not limited to an electromagnetic signal, an optical signal or any suitable combination of the above. The computer-readable signal medium may also be any computer-readable medium oilier than a computer-readable storage medium, the computer-readable signal may transmit, propagate, or transmit a program for use by or in combination with an instruction execution system, apparatus, or device. The program code included on the computer-readable medium may be transmitted with any suitable medium, including but not limited to: a wire, an optical cable, an radio frequency (RF), etc., or any suitable combination of the above.

The computer-readable medium may be included in the electronic device; or it may also exist alone without being assembled into the electronic device.

The computer-readable medium carries one or more programs, and when the one or more programs are executed by the electronic device, the electronic device; acquire a reply instruction acting on a target question in an information display interface; display a shooting interface in response to the reply instruction; acquire a target video through the shooting interface, where the target video is used to reply to the target question.

The computer program code for executing an operation of the present disclosure may be written in one or more programming languages or combinations thereof, including but not limited to object-oriented programming languages such as Java, Smalltalk, C++, and conventional procedural programming languages such as "C" language or similar programming languages. The program code may be executed completely on a user's computer, partially on a user's computer, as a separate software package, partially on a user's computer and partially on a remote computer, or completely on a remote computer or server. In the case of a remote computer, the remote computer may be connected to the user computer through any kind of network, including a local area network (LAN) or a wide area network (WAN), or may be connected to an external computer (for example, using an Internet service provider to connect through the Internet).

In some embodiments, a client and a server can communicate using any currently known or future developed network protocol such as HTTP (Hypertext Transfer Protocol), and can be interconnected with any form or medium of digital data communication (for example, communication network). Examples of communication network include a local area network ("LAN"), a wide area network ("WAN"), an Internet (for example, the Internet), and an end-to-end network (for example, an ad hoc end-to-end network), as well as any currently known or future developed network.

The flowcharts and block diagrams in the accompanying drawings illustrate possible implementation architecture, functions and operations of system, method and computer program product according to various embodiments of the present disclosure. In this regard, each block in a flowchart or a block diagram may represent a module, a program segment, or a part of code, the module, the program segment, or the part of code includes one or more executable instructions for implementing a specified logical function. It should also be noted that in some alternative implementations, the function marked in the block may also occur in a different order than those marked in the drawings. For example, two blocks represented successively may actually be executed basically in parallel, and they may sometimes be executed in an opposite order, depending on the function involved. It should also be noted that each block in the block diagram and/or flowchart and the combination of blocks in the block diagram and/or flowchart may be implemented by a dedicated hardware based system executing specified functions or operations, or by a combination of dedicated hardware and computer instructions.

The modules described in the embodiments of the present disclosure may be implemented in software or in hardware. In some cases, the name of the module does not constitute a limitation of the unit itself.

The functions described above herein may be performed at least in part by one or more hardware logic units. For example, without limitation, exemplary types of hardware logic components that can be used include: a field programmable gate array (FPGA), an application specific integrated circuit (ASIC), an application specific standard part (ASSP), system on chip (SOC), a complex programmable logic device (CPLD), etc.

In the context of the present disclosure, a computer-readable medium may be a tangible medium that may contain or store a program for use by or in combination with an instruction execution system, apparatus or device. The computer-readable medium may be a computer-readable signal medium or a computer-readable storage medium. Computer-readable medium may include, but is not limited to, an electronic, a magnetic, an optical, an electromagnetic, an infrared, or a semiconductor system, apparatus or device, or any suitable combination of the above. More specific examples of the computer-readable storage medium may include an electrical connection based on one or more wires, a portable computer disk, a hard disk, an random access memory (RAM), an read only memory (ROM), an erasable programmable read only memory (EPROM or flash memory), an optical fiber, a portable compact disk-read only memory (CD-ROM), an optical storage device, a magnetic storage device, or any suitable combination of the above.

In a first aspect, according to one or more embodiments of the present disclosure, there is provided an information interaction method, including: displaying target information in an information display interface; acquiring a reply instruction for the target information; displaying a shooting interface in response to the reply instruction; and acquiring a target video through the shooting interface, where the target video is used to reply to the target information.

According to one or more embodiments of the present disclosure, after acquiring the target video through the shooting interface, further including: displaying a video cover of the target video at a first target position of the information display interface, where the first target position is located in an information reply zone corresponding to the target information.

According to one or more embodiments of the present disclosure, a preset identification is displayed in a display zone of the target information, and the preset identification is used to identify an information type of the target information.

According to one or more embodiments of the present disclosure, the information interaction method further includes: displaying a video cover of an original video at a second target position of the information display interface, where the target information is information generated for the original video.

According to one or more embodiments of the present disclosure, the information display interface includes an information aggregation interface, the information aggregation interface is used to display at least one piece of target information, where each piece of target information is provided with a corresponding trigger control; before the displaying the shooting interface, the method further includes: acquiring the reply instruction acting on a target trigger control in the information aggregation interface, where the target trigger control is used to instruct to reply to corresponding target information.

According to one or more embodiments of the present disclosure, the information interaction method further includes: displaying an user homepage interface, where the user homepage interface is used to display user information; acquiring a first jump instruction acting on a first jump control in the user homepage interface; and jumping to display the information aggregation interface in response to the first jump instruction.

According to one or more embodiments of the present disclosure, the information interaction method further includes: displaying an information notification interface, where the information notification interface is used to display at least one piece of notification information; acquiring a second lump instruction acting on a second jump control in the information notification interface; and jumping to display the information aggregation interface in response to the second jump instruction.

According to one or more embodiments of the present disclosure, the information display interface includes a live broadcast interface, and before the displaying the shooting, interface, further including: acquiring a question sticker, where the question sticker is used to accommodate the target information; and displaying the question sticker in the live broadcast interface and acquiring the reply instruction acting on the question sticker.

According to one or more embodiments of the present disclosure, the information display interface includes a question-and-answer community interface, the question-and-answer community interface is used to display at least one piece of target information, and before the displaying the shooting interface, further including: acquiring the reply instruction acting on the target information in the question-and-answer community interface.

According to one or more embodiments of the present disclosure, the displaying the shooting interface in response to the reply instruction includes: displaying an information input interface in response to the reply instruction, where the information input interface includes a text input box and a video input control: and acquiring a first trigger instruction acting on the video input control, wherein the first trigger instruction is used to call the shooting interface.

According to one or more embodiments of the present disclosure the text input box and the video input control are displayed side by side, and the method further includes: displaying the video input control in a reduced size if it is detected that text is input in the text input box.

According to one or more embodiments of the present disclosure, the information interaction method further includes: acquiring a s trigger instruction acting on the target information in a current interface, where the current interface is any type of interface other than an information aggregation interface among interface types included in the information display interface, and the information aggregation interface is used to display at least one piece of target information; and jumping to display the information aggregation interface in response to the second trigger instruction, and the target information is displayed in a top zone of the information aggregation interface.

According to one or more embodiments of the present disclosure, acquiring the target video through the shooting interface includes: calling a camera to shoot the target video in response to a shooting instruction acting on the shooting interface; or, uploading the target video in response to an upload instruction acting on the shooting interface.

According to one or more embodiments of the present disclosure, after the displaying the shooting interface, further including: displaying a sticker on the shooting interface, where the sticker is used to accommodate the target information.

According to one or more embodiments of the present disclosure, the sticker is further used to accommodate a preset identification where the preset identification is used to identify an information type of the target information.

According to one or more embodiments of the present disclosure, the information interaction method further includes: acquiring an editing instruction acting on the sticker, where the editing instruction is used to adjust a display feature of the sticker on a video cover corresponding to the target video, where the display feature includes at least one of a display zone position, a display zone area, a display text feature, and a sticker style.

According to one or more embodiments of the present disclosure, the information interact method further includes: displaying the sticker in a playback interface of the target video.

In a second aspect, according to one or more embodiments of the present disclosure, there is provided. an information interaction apparatus, including: a displaying module, configured to display target information in an information display interface; an acquiring module, configured to acquire a reply instruction for the target information; the displaying module is further configured to display a shooting interface in response to the reply instruction: and an inputting module, configured to acquire a target video through the shooting interface, where the target video is used to reply to the target information.

According to one or more embodiments of the present disclosure, the displaying module is further configured to display a video cover of the, target video at a first target position of the information display interface, where the first target position is located in an information reply zone corresponding to the target information.

According to one or more embodiments of the present disclosure, a preset identification is displayed in a display zone of the target information, and the preset identification is used to identify an information type of the target information.

According to one or more embodiments of the present disclosure, the displaying module is further configured to display a video cover of an original video at a second target position of the information display interface, where the target information is information generated for the original video.

According to one or more embodiments of the present disclosure, the information display interface includes an information aggregation interface, the information aggregation interface is used to display at least one piece of target information, where each piece of target information is provided with a corresponding trigger control; the acquiring module is thither configured to acquire the reply instruction acting on a target trigger control in the information aggregation interface, where the target trigger control is used to instruct to reply to corresponding target information.

According to one or more embodiments of the present disclosure, the displaying module is further configured to display an user homepage interface, where the user homepage interface is used to display user information; the acquiring module is further configured to acquire a first jump instruction acting on a first jump control in the user homepage interface; and the displaying module is further configured to jump to display the information aggregation interface in response to the first jump instruction.

According, to one or more embodiments of the present disclosure, the displaying module is further configured to display an information notification interface, where the information notification interface is used to display at least one piece of notification information the acquiring module is further configured to acquire a second jump instruction acting on a second jump control in the information notification interface; the displaying module is further configured to jump to display the information aggregation interface in response to the second jump instruction.

According to one or more embodiments of the present disclosure, the acquiring module is further configured to acquire a question sticker, where the question sticker is used to accommodate the target information; and the displaying module is further configured to display the question sticker in the live broadcast interface and acquire the reply instruction acting on the question sticker.

According to one or more embodiments of the present disclosure, the information display interface includes a question-and-answer community interface, the question-and-answer community inter face is used to display at least one piece of target information, and the acquiring module is further configured to acquire the reply instruction acting on the target information in the question-and-answer community interface.

According to one or more embodiments of the present disclosure, the displaying module is further configured to display an information input interface in response to the reply instruction where the information input interface includes a text input box and a video input control; and the acquiring module is further configured to acquire a first trigger instruction acting on the video input control, where the first trigger instruction is used to call the shooting interface.

According to one or more embodiments of the present disclosure, the displaying module is further configured to display the video input control in a reduced size if it is detected that text is input, in the text input box.

According to one or more embodiments of the present. disclosure, the acquiring module is further configured to acquire a second trigger instruction acting on the target information in a current interface, where the current interface is any type of interface other than an information aggregation interface among interface types included in the information display interface, and the information aggregation interface is used to display at least one piece of target information; and the displaying module is fluffier configured to jump to display the information aggregation interface in response to the second trigger instruction, and the target information is displayed in a top zone of the information aggregation interface.

According to one or more embodiments of the present disclosure, the acquiring module is specifically configured to: call a camera to shoot the target video in response to a shooting instruction acting on the shooting interface; or, upload the target video in response to an upload instruction acting on the shooting interface.

According to one or more embodiments of the present disclosure, the displaying module is further configured to display a sticker on the shooting interface, and the sticker is used to accommodate the target information.

According to one or more embodiments of the present disclosure, the sticker is further used to accommodate a preset identification, where the preset identification is used to identify an information, type of the target information.

According to one or more embodiments of the present disclosure, the acquiring module is further configured to acquire an editing instruction acting on the sticker, where the editing instruction is used to adjust a display feature of the sticker on a video cover corresponding to the target video, the display feature include at least one of a display zone position, a display zone area, a display text feature, and a sticker style.

According to one or more embodiments of the present disclosure, the displaying module is further configured to display the sticker in a playback interface of the target video.

In a third aspect, an embodiment of the present disclosure provides an electronic device, including: a processor; and a memory storing a computer program; where the processor is configured to implement the information interaction method according to the first aspect and various possible designs of the first aspect above by executing the computer program.

In a fourth aspect, the embodiment of the present disclosure provides a computer-readable storage medium, where a computer execution instruction is stored in the computer-readable storage medium, when a processor executes the computer execution instructions, the information interaction method according to the first aspect and various possible designs of the first aspect is implemented.

In a fifth aspect, the embodiment of the present disclosure provides a computer program product including a computer program, when the, computer program is executed by a processor, the information interaction method according to the first aspect and various possible designs of the first aspect is implemented.

In a sixth aspect, the embodiment of the present disclosure provides a computer program, when the computer program is executed by a processor, the information interaction method according to the first aspect and various possible designs of the, first aspect is implemented.

The above description is only a better embodiment of the present disclosure and a description of applied technical principles. Those skilled in the art should understand that the disclosure scope involved in the present disclosure is not limited to the technical solutions formed by the specific combination of the above technical features, but also covers other technical solutions formed by arbitrary combination of the above technical features or their equivalent features without departing from the above disclosure concept. For example, a technical solution formed by replacing the above features with (but not limited to) the technical features with similar functions disclosed in the present disclosure.

In addition, although operations are described in a specific order, this should not be understood as requiring these operations to be performed in the specific order shown or in a sequential order. Under certain circumstances, multitasking and parallel processing; may be advantageous. Similarly, although several specific implementation details are included in the above discussion, these should not be interpreted as limiting the scope of the present disclosure. Certain features described in the context of individual embodiments may also be implemented in combination in a single embodiment. Conversely, various features described in the context of a single embodiment may also be implemented in multiple embodiments individually or in any suitable sub-combination.

Although the subject matter has been described in language specific to structural features and/or logical actions of methods, it should be understood that the subject matter defined in the appended claims is not limited to the specific features or actions described above. On the contrary, the specific features and actions described above are only exemplary forms of implementing the claims.

What is claimed is:

1. An information interaction method, comprising:
    displaying target information, in a graphical user interface displayed by a display device;
    acquiring, based on a first user input received in the graphical user interface, a first instruction directed to the target information, and displaying, by the display device, a video acquisition interface in response to the first instruction;
    acquiring a target video using the video acquisition interface, wherein the target video is a video related to the target information;
    after acquiring the target video, displaying, in the graphical user interface, a sticker on the target video, wherein the sticker comprises at least a portion of the target information to which the first instruction was directed;
    publishing the target video with the sticker, based on a third user input received in the graphical user interface;
    displaying, in the graphical user interface, the target video with the sticker, wherein the target video is published on a feed.

2. The method according to claim 1, wherein the target information is displayed in a comment area.

3. The method according to claim 2, wherein the target information comprises a text, emoji, an image, or a video.

4. The method according to claim 1, wherein the target information is displayed in an information aggregation interface.

5. The method according to claim 1, wherein the target information is displayed in a video published on the feed.

6. The method according to claim 1, wherein the target information is displayed in a homepage of a user.

7. The method according to claim 1, further comprising:
    displaying the sticker in the video acquisition interface while or before acquiring the target video.

8. The method according to claim 1, further comprising:
    in response to acquiring an editing instruction directed to the sticker in the video acquisition interface, adjusting, based on a second user input received in the graphical user interface, a display feature of the sticker on the target video.

9. The method according to claim 8, wherein the editing instruction directed to the sticker causes the sticker to move from a first position relative to the target video to a second position.

10. The method according to claim 7, wherein the sticker comprises at least a portion of the target information and an image associated with a user.

11. The method according to claim 1, further comprising:
    uploading the target video in response to an upload instruction acting on the video acquisition interface.

12. The method according to claim 2, further comprising:
    displaying a video cover of the target video in a reply area associated with the target information between the target information and different target information.

13. The method according to claim 1, further comprising:
displaying a video cover of the target video in the graphic user interface of a user notification.

14. The method according to claim 4, wherein the target video plays in a playback interface;
during a playback of the target video, jumping, from the playback interface, based on a third user input received in the playback interface, to the information aggregation interface.

15. An electronic device, comprising:
a processor; and
a memory storing a computer program;
wherein the processor is configured to call and run the computer program stored in the memory to:
display target information, in a graphical user interface displayed by a display device;
acquire, based on a first user input received in the graphical user interface, a first instruction directed to the target information, and display, by the display device, a video acquisition interface in response to the first instruction;
acquire a target video using the video acquisition interface, wherein the target video is a video related to the target information;
after acquiring the target video, display, in the graphical user interface, a sticker on the target video, wherein the sticker comprises at least a portion of the target information to which the first instruction was directed;
publish the target video with the sticker, based on a third user input received in the graphical user interface;
display, in the graphical user interface, the target video with the sticker, wherein the target video is published on a feed.

16. A non-transitory computer-readable storage medium, storing therein computer executable instructions which, when executed by a processor, cause the processor to:
display target information, in a graphical user interface displayed by a display device;
acquire, based on a first user input received in the graphical user interface, a first instruction directed to the target information, and display, by the display device, a video acquisition interface in response to the first instruction;
acquire a target video using the video acquisition interface, wherein the target video is a video related to the target information;
after acquiring the target video, display, in the graphical user interface, a sticker on the target video, wherein the sticker comprises at least a portion of the target information to which the first instruction was directed;
publish the target video with the sticker, based on a third user input received in the graphical user interface;
display, in the graphical user interface, the target video with the sticker, wherein the target video is a video published on a feed.

17. The non-transitory computer-readable storage medium according to claim 16, wherein the target information is displayed in a comment area.

18. The non-transitory computer-readable storage medium according to claim 17, wherein the target information comprises text, emoji, image, or video.

19. The non-transitory computer-readable storage medium according to claim 16, wherein the target information is displayed in an information aggregation interface.

20. The non-transitory computer-readable storage medium according to claim 16, wherein the target information is displayed in a video published on the feed.

21. The non-transitory computer-readable storage medium according to claim 16, wherein the target information is displayed in a homepage of a user.

22. The non-transitory computer-readable storage medium according to claim 16, wherein the computer executable instructions which, when executed by the processor, further cause the processor to:
display the sticker in the video acquisition interface while or before acquiring the target video.

23. The non-transitory computer-readable storage medium according to claim 16, wherein the computer executable instructions which, when executed by the processor, further cause the processor to:
in response to acquiring an editing instruction directed to the sticker in the video acquisition interface, adjust, based on a second user input received in the graphical user interface, a display feature of the sticker on the target video.

24. The non-transitory computer-readable storage medium according to claim 23, wherein the editing instruction directed to the sticker causes the sticker to move from a first position relative to the target video to a second position.

25. The non-transitory computer-readable storage medium according to claim 22, wherein the sticker comprises at least a portion of the target information and an image associated with a user.

26. The non-transitory computer-readable storage medium according to claim 16, wherein the computer executable instructions which, when executed by the processor, further cause the processor to:
upload the target video in response to an upload instruction acting on the video acquisition interface.

27. The non-transitory computer-readable storage medium according to claim 17, wherein the computer executable instructions which, when executed by the processor, further cause the processor to:
display a video cover of the target video in a reply area associated with the target information between the target information and different target information.

28. The non-transitory computer-readable storage medium according to claim 16, wherein the computer executable instructions which, when executed by the processor, further cause the processor to:
display a video cover of the target video in the graphic user interface of a user notification.

29. The non-transitory computer-readable storage medium according to claim 19, wherein the target video plays in a playback interface; and the computer executable instructions which, when executed by the processor, further cause the processor to:
during a playback of the target video, jump, from the playback interface, based on a third user input received in the playback interface, to the information aggregation interface.

* * * * *